United States Patent
Forsyth et al.

(10) Patent No.: US 9,170,955 B2
(45) Date of Patent: Oct. 27, 2015

(54) PROVIDING EXTENDED CACHE REPLACEMENT STATE INFORMATION

(71) Applicant: Intel Corporation, Santa Clara, CA (US)

(72) Inventors: Andrew T. Forsyth, Kirkland, WA (US); Ramacharan Sundararaman, Hillsboro, OR (US); Eric Sprangle, Austin, TX (US); John C. Mejia, Hillsboro, OR (US); Douglas M. Carmean, Hillsboro, OR (US); Edward T. Grochowski, San Jose, CA (US); Robert D. Cavin, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 13/685,991

(22) Filed: Nov. 27, 2012

(65) Prior Publication Data

US 2014/0149651 A1    May 29, 2014

(51) Int. Cl.
 *G06F 12/08* (2006.01)
 *G06F 12/12* (2006.01)
(52) U.S. Cl.
 CPC ............ *G06F 12/126* (2013.01); *G06F 12/123* (2013.01); *Y02B 60/1225* (2013.01)
(58) Field of Classification Search
 CPC ... G06F 12/126; G06F 12/128; G06F 12/123; G06F 12/0684; G06F 12/0891; G06F 12/0862; G11C 7/22; G11C 7/1006; G11C 7/1051; G11C 7/1072; G11C 7/1078
 USPC ......... 711/105, 133, 134, 135, 136, 137, 151, 711/158, 160
 See application file for complete search history.

(56) References Cited

U.S. PATENT DOCUMENTS

| | | | |
|---|---|---|---|
| 6,393,525 B1 * | 5/2002 | Wilkerson et al. ............ | 711/136 |
| 6,434,669 B1 * | 8/2002 | Arimilli et al. ............... | 711/128 |
| 6,490,654 B2 * | 12/2002 | Wickeraad et al. ........... | 711/133 |
| 6,643,737 B1 * | 11/2003 | Ono ............................... | 711/128 |
| 6,662,173 B1 * | 12/2003 | Hammarlund et al. ................ | 1/1 |
| 6,996,678 B1 | 2/2006 | Sharma | |
| 7,010,649 B2 * | 3/2006 | Davis et al. .................... | 711/133 |
| 7,177,985 B1 * | 2/2007 | Diefendorff ................... | 711/137 |
| 7,757,045 B2 | 7/2010 | Shannon et al. | |
| 7,991,956 B2 | 8/2011 | Illikkal et al. | |
| 8,131,931 B1 * | 3/2012 | Roberts et al. ................. | 711/118 |

(Continued)

OTHER PUBLICATIONS

Raveendran, LLRU, Dec. 28, 2007, IEEE, ISBN 0-7695-3059-1, p. 339-344.*

(Continued)

*Primary Examiner* — Jared Rutz
*Assistant Examiner* — Khoa D Doan
(74) *Attorney, Agent, or Firm* — Trop, Pruner & Hu, P.C.

(57) ABSTRACT

In an embodiment, a processor includes a decode logic to receive and decode a first memory access instruction to store data in a cache memory with a replacement state indicator of a first level, and to send the decoded first memory access instruction to a control logic. In turn, the control logic is to store the data in a first way of a first set of the cache memory and to store the replacement state indicator of the first level in a metadata field of the first way responsive to the decoded first memory access instruction. Other embodiments are described and claimed.

23 Claims, 8 Drawing Sheets

(56) References Cited

U.S. PATENT DOCUMENTS

| | | |
|---|---|---|
| 2002/0078310 A1* | 6/2002 | Frank et al. .................... 711/148 |
| 2003/0177315 A1* | 9/2003 | Hooker ......................... 711/137 |
| 2004/0083341 A1* | 4/2004 | Robinson et al. ............. 711/133 |
| 2004/0221110 A1 | 11/2004 | Rowlands et al. |
| 2006/0117145 A1* | 6/2006 | Sprangle et al. .............. 711/137 |
| 2008/0040551 A1 | 2/2008 | Gray et al. |
| 2008/0091874 A1* | 4/2008 | Waltermann et al. ......... 711/112 |
| 2009/0172291 A1* | 7/2009 | Sprangle et al. .............. 711/134 |
| 2009/0222626 A1* | 9/2009 | Ingle et al. .................... 711/133 |
| 2011/0145506 A1 | 6/2011 | Cherukuri et al. |
| 2011/0161589 A1* | 6/2011 | Guthrie et al. ................ 711/122 |
| 2012/0137075 A1 | 5/2012 | Vorbach |
| 2013/0145104 A1* | 6/2013 | Hsu ............................... 711/141 |
| 2013/0297876 A1* | 11/2013 | Yu ................................. 711/122 |

OTHER PUBLICATIONS

Zhang Chuanjun, A tag-based cache replacement, IEEE, Oct. 3, 2010, ISBN 978-1-4244-8936-7, p. 92-97.*

U.S. Appl. No. 13/285,414, filed Oct. 31, 2011 entitled "Controlling a Turbo Mode Frequency of a Processor," by Avinash N. Ananthakrishnan, et al.

International Searching Authority, "Notification of Transmittal of the International Search Report and the Written Opinion of the International Searching Authority," mailed Oct. 31, 2013, in International application No. PCT/US2013/048796.

* cited by examiner

PROVIDING EXTENDED CACHE REPLACEMENT STATE INFORMATION

BACKGROUND

In a processor-based system, a cache memory is used to temporarily store information including data and instructions to enable more rapid access by processing elements of the system such as one or more processors, graphics devices and so forth. Modern processors include internal cache memories that act as depositories for frequently used and recently used information. Because this cache memory is within a processor package and typically on a single semiconductor die with one or more cores of the processor, much more rapid access is possible than from more remote locations of a memory hierarchy, which include system memory.

To enable maintaining the most relevant information within a cache, some type of replacement mechanism is used. Many systems implement a type of least recently used algorithm to maintain information. More specifically, each line of a cache is associated with metadata information relating to the relative age of the information such that when a cache line is to be replaced, an appropriate line for eviction can be determined. While such least recently used schemes work reasonably well, they are not appropriate for certain types of data. One such data type is streaming data (which is typically accessed only once) that is not typically stored in a cache memory. However there are instances where this data is accessed again, which can cause an undesirable delay to again re-access the data. Another type of data is so-called strongly resident data that is desirable to be maintained in a cache memory for longer than possible using a least recently used scheme.

DETAILED DESCRIPTION

Figure 1:
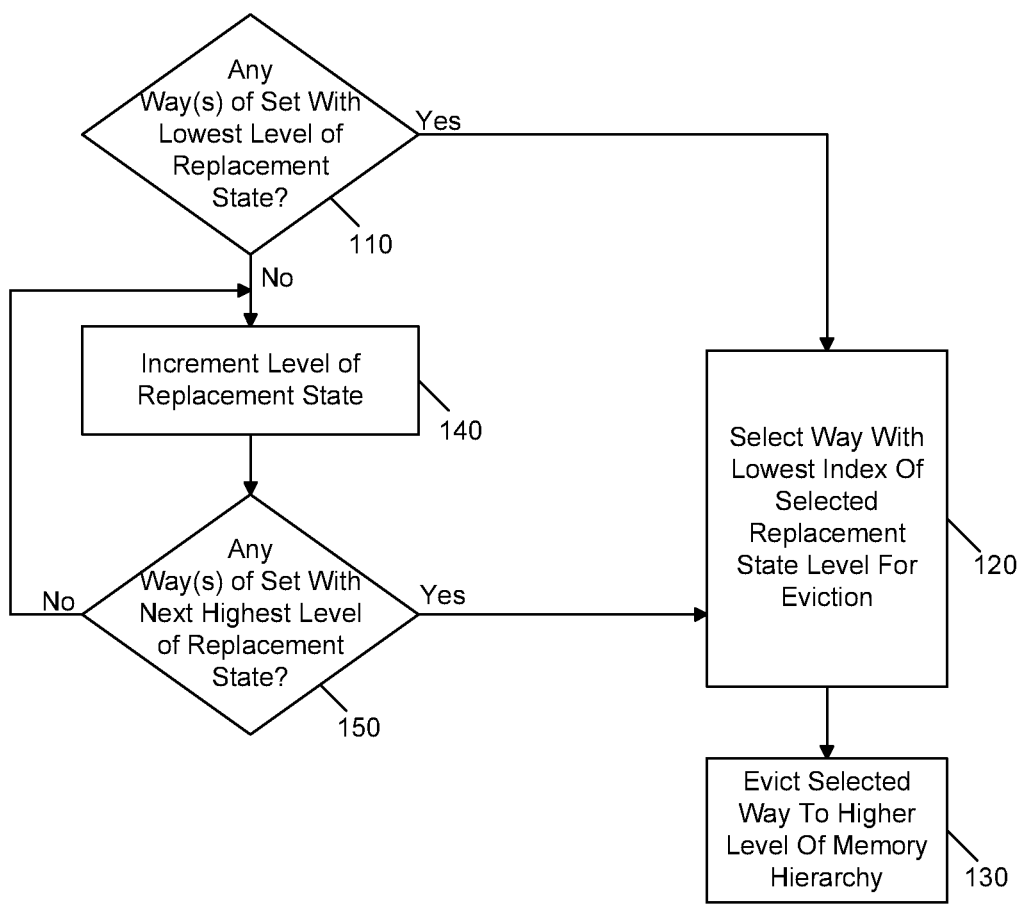
FIG. 1 is a flow diagram of a method for selecting a cache line for eviction using replacement state information in accordance with an embodiment of the present invention.

In various embodiments, replacement state information for each line of a cache memory can be maintained in a manner to provide multiple levels of replacement suitability. Although the scope of the present invention is not limited in this regard, in an embodiment four such states may be provided. Furthermore, this state information can be maintained on a per set basis such that when determining whether to replace a line within a set of a set-associative cache memory, this replacement state information of all of the ways within the set can be analyzed. As will be described below, different techniques of associating a given replacement state with data within a line can occur. For example, in different embodiments this replacement state information can originate from instructions such as user-level instructions, hints, or information from various control and configuration information such as range registers that indicate a type of data stored in a particular memory region.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, an instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file). In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate and for execution of memory access instructions, a replacement state level to be associated with data of the instructions.

Single instruction multiple data (SIMD) technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.), and all of such processors may implement embodiments of the present invention. In one embodiment, destination and source registers/data are generic terms to represent the source and destination of the corresponding data or operation. In some embodiments, they may be implemented by registers, memory, or other storage areas having other names or functions than those depicted.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Data types of different widths such as 64 byte cache line widths or any other width can leverage embodiments of the present invention.

Note that the replacement state information used in embodiments of the present invention do not provide an age-based or actual relative age of each way within a set. Further, the replacement state information is not a so-called tree-based pseudo least recently used mechanism. Instead, the multiple level replacement state information enables each cache line to be in one of N different groups of suitability for replacement (where in many embodiments N is less than the number of ways within a set and greater than 2). As used herein, the terms way and cache line both refer to an entry of a cache memory that stores data; in many embodiments a cache memory is arranged as a multi-way multi-set associative cache in which each set includes a plurality of ways.

In an embodiment 2 bits of replacement state information may be maintained per way, enabling N to be 4. These states are as follows, in this embodiment. The highest level state, state 3, is referred to as a strongly-resident (SR) state which identifies a cache line including data to be maintained in the cache memory for a relatively long time, namely longer than a conventional least recently used scheme. Examples of such data include data to be used as coefficients or other constants in a program, which would desirably be maintained in a separate scratchpad memory. A next highest level state, state 2, more recently used (MeRU) state, is used to refer to a cache line that has been more recently accessed (than other ways of the set). Such cache line thus is less of a candidate for eviction. In an embodiment, a normal access to a cache line (without a special hint or instruction as described herein) may cause its state to be set to this more recently used state. A next highest state or second lowest state, state 1, is referred to as less recently used (LeRU) state, is used to refer to a cache line that has been less recently used than at least one other way of the set. Such cache line thus may be a more suitable candidate for eviction. The lowest level state, state 0, is referred to as an evict hint (EH) state that identifies a cache line that can be replaced before any other line. These four states can be represented in a manner or bit pattern for a particular implementation (possibly using more than 2 bits, e.g., a "one hot" scheme).

In an embodiment, states 1 and 2 may be used for typical data access, while special software instructions, hints, or other data such as from memory type range registers (MTRRs) allocate lines to states 0 and 3.

In one embodiment, the following rules may be used to determine a replacement cache line (and possible update to other ways' replacement state values):

1. When choosing a way for eviction, a way with the lowest-numbered priority level is selected. If there are no ways at state 0, pick a way at state 1. If there are no ways at state 1, pick a way at state 2. If there are no ways at state 2, pick a way at state 3. If there are multiple ways at a given state level, select the way with the lowest index (e.g., choose way 3 over way 7).

2. When accessing a way through a normal load or store instruction, if it is in state 0 (EH) or 1 (LeRU), change it to state 2 (MeRU). If it is already in state 2 (MeRU) or state 3 (SR), do not change its state.

3. If changing the state of a particular way results in all ways of a set being at the same state (e.g., all ways are now at state 2), decrement the state of all other ways of the set (e.g., by one) and set the newly updated way to the desired state (in this example, all ways of the set would now be at state 1, except for the way that has been updated, which is now in state 2).

As an example of operation, an accessed way may be marked as MeRU (because it was accessed). If marking this way would cause all ways of the set to be indicated at this state, this way may be maintained as MeRU and all other lines in this state instead updated to be LeRU.

When searching for a way to replace (because space is needed for a new cache line), the way with the lowest replacement state level and having the lowest index may be chosen for eviction. As a result, ways are chosen for eviction in a consistent order, which acts to sort the lines and produces higher performance in real-world applications.

Referring now to FIG. 1, shown is a flow diagram of a method for selecting a cache line for eviction using replacement state information in accordance with an embodiment of the present invention. As shown in FIG. 1, method 100 may be performed by various logic of a processor, such as a control logic associated with a particular level of cache memory. For example in an embodiment a given level of a cache memory can include or be associated with a cache controller that includes various logic to control writing, reading and other operations with respect to the cache.

As seen in FIG. 1, method 100, which is initiated responsive to a determination that a cache line is to be evicted (which may occur upon a request to write data into the cache while a set of the cache into which the data is to be written is full) begins at diamond 110. At diamond 110 it can be determined whether any ways of the set have a lowest level of replacement state information. Although the scope of the present invention is not limited in this regard in an embodiment, each line can be identified with each of four levels of replacement state. As an example, two bits of metadata can encode a given one of these four levels. If it is determined that one or more ways of the set have the lowest level replacement state information, control passes to block 120 where a way of these one or more ways that have a lowest index can be selected for eviction. That is, a set of a cache memory includes a plurality of ways (e.g., eight ways). Each of these ways is identified with an index value (e.g., from zero to seven). In this example assuming that more than one of the ways has a lowest level replacement state information, the corresponding way having the smallest index value may be selected for eviction. Thus eviction may proceed by writing the data in this cache line to a next higher level of a memory hierarchy, such as a higher level cache or to system memory (block 130).

Still referring to FIG. 1, if instead it is determined that no ways of the set have a lowest level of replacement state information, control instead passes to block 140 where the level of replacement state information to be searched for is incremented. Control then passes to block 150 where it can be determined whether any ways of the set have this next higher level of replacement state information. If so, as with the above case control passes to blocks 120 and 130. If no ways are present in the set with this next higher level of replacement state information, control passes again back to block 140 where the level of replacement state information to be analyzed is again incremented. Thus at the conclusion of method 100, an appropriate cache line for eviction is identified and the cache line is evicted to enable incoming data (e.g., of a read or write access) to be stored. As such the data of the evicted cache line is sent to a more distant portion of the memory hierarchy, and cache coherency metadata of the cache line can be updated accordingly.

Replacement state information associated with a cache line can be set to an appropriate level when data is first written into the cache line. Then during operation of the cache as additional information is written into other ways of a set, replacement state information of the other ways within the set may be updated.

Figure 2:
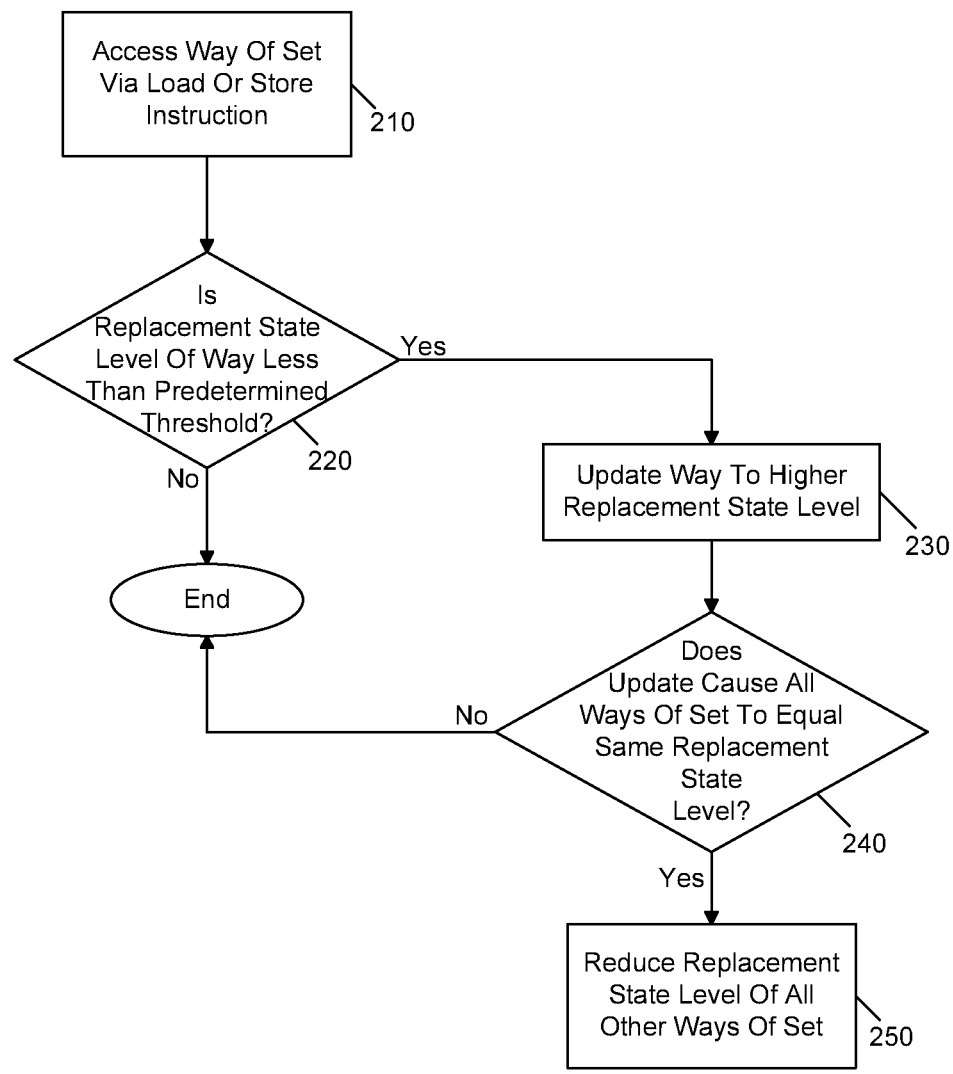
FIG. 2 is a flow diagram of a method for updating replacement state information in accordance with an embodiment of the present invention.

Referring now to FIG. 2, shown is a flow diagram of a method for updating replacement state information in accordance with an embodiment of the present invention. As shown in FIG. 2, method 200 may be implemented by various logic of a processor, such as a cache controller associated with a given cache memory. As seen, method 200 begins by accessing a way of a set via a load or store instruction (block 210). For a load instruction, requested data obtained from a more remote level of a memory hierarchy may be stored into a cache line, while for a store instruction data (such as data modified in a core of the processor) to be written to a system memory is stored into the line. Next it can be determined whether the way replacement state level for this particular cache line is less than a predetermined threshold level (diamond 220). Although the scope of the present invention is not limited in this regard, in a mechanism that implements four replacement state levels, this predetermined threshold level may be the second lowest thread level. If it is determined that the replacement state level is not less than this threshold level, the method may conclude such that the requested data is stored into the cache line and the current replacement state level of that cache line is maintained (and no updates are made to the replacement state information of the other cache lines).

If instead it is determined that the replacement state level is less than the threshold level, control passes from diamond 220 to block 230 where the way can have its replacement state level updated to a higher level. As will be described below, depending on the type of the data and/or the type of instruction responsive to which the data is being stored different levels can be indicated. Next at diamond 240 it can be determined whether this update would cause all ways of the set to be equal the same replacement state level. If so, control passes to block 250 where the replacement state level of all other ways of the set can be reduced, e.g., decremented by one. Otherwise if the updating of a particular way's replacement state level does not cause all ways to be set to the same level, no further action is taken as to the replacement state level of the other ways. Although shown at this high level in the embodiment of FIG. 2, understand the scope of the present invention is not limited in this regard.

Some implementations provide for user-level instructions that allow a programmer to manipulate the states directly. In such implementations, these instructions may generally include memory access instructions that, in addition to the type of operation, e.g., a prefetch or load operation, encode an indication of a replacement state level to be stored in a corresponding cache line. Other such instructions may be used to update a level of replacement state information associated with a particular address.

In one embodiment, a prefetch instruction, e.g., having the mnemonic prefetchsr [mem] is to cause insertion of a prefetch of data at a corresponding memory location ([mem]) into a cache memory and mark the line in state 3, or strongly resident. Note that this still obeys Rule #3 above, in that if all other ways in a set would now be in state 3, all other ways of the set are set to state 2 (MeRU) and the prefetched line is set to state.

A similar instruction is a prefetch to mark the line into another state. In one embodiment, a prefetch instruction having the mnemonic prefetchnsr [mem] is to cause a standard prefetch of data and marking of the corresponding cache line in state 2 (MeRU). Further the instruction acts to determine if the data corresponding to the memory address is already present in a cache line of the cache memory and if in state 3 (SR), it will move it down to state 2 (MeRU). This instruction thus allows a programmer to unmark lines previously marked as strongly resident, allowing precise management of a strongly-resident set. Note that if in a given instruction set architecture opcode space is limited and this instruction cannot be implemented, cache line eviction/flush instructions may be used instead, though these may have the side effect of evicting the line.

Another instruction in an embodiment is a cache line eviction hint instruction, e.g., having the mnemonic clevicthint [mem], which is to cause a cache line (if still present in the cache) to be placed in state 0 (EH), rather than forcibly evicting it. This encourages the line to be evicted early, and makes sure it does not force any other line to be evicted before it. However unlike a cache line flush instruction, if the line is then hit by another load or store instruction (either because the programmer made a mistake, or because the tracking of eviction lines was probabilistic rather than guaranteed), the line will be updated into state 2. This is far less disastrous than the behavior of accessing the target of clflush instruction or non-temporal store. However, in some highly-tuned workloads that a priori know exact operation, this operation may be avoided.

Other example instructions include store instructions with EH hints. Such instructions may be executed to perform a standard coherent store and set the line to state 0 (EH). Combining the store with setting the state to 0 (EH) reduces the number of instructions and simplifies cache management. Still other instructions include loads with EH hints, which act to load data and set the state to 0 (EH). Other user-level instructions include a prefetch with EH.

Note that the above-described prefetch* and cl* instructions can have variants that affect each of the cache levels within a memory hierarchy. Also note that a cache line's state in any one level of cache is completely independent of its state in any other levels, though as usual for performance reasons it is recommended that if further caches are inclusive, they should not evict lines present in nearer caches, whatever their state (commonly called the "hot L1$, cold L2$ problem").

Note that none of these instructions imply memory ordering fences, pipeline flushes or stalls, which may occur during operation of an out-of-order processor. Also note that none of the states has any effect on coherence or observed memory ordering of a processor architecture, as existing memory rules are observed. As such these cache states described herein are hints only (though often fairly robust ones), and the entire cache may still be snooped, shared, paged out to disk, swapped back in, remapped, hidden behind virtualization layers and so on. It also means that if an application was written for a certain size of cache, it will scale up or down to a new microarchitecture with different sizes, number of sets or associativity of caches with some degree of elegance. Indeed, the program may be executed on hardware that does not implement anything but a traditional least recently used scheme as long as the above instructions are executed as no operations (NOPs), the program will still work, without a dramatic performance loss in doing so.

Various configuration options as to replacement state information may be present in certain embodiments. Such operations may be controllable via operating system (OS) or by basic input/output system (BIOS) configuration. As one configuration option, a maximum number of ways of a set may be allowed to be at a highest replacement state level (namely state 3 (SR)). In various situations, a limit of between approximately 25% to 50% of the ways may be allowed to be set to the highest level. In such cases, if the programmer attempts more, all state 3 lines are reset to state 2 and the new line is set to state 3.

When an OS switches between tasks, a mechanism may cause all state 3 lines to be switched to a lower (e.g., state 2) level. This prevents lines from the old process persisting, which is not much use if the old process is no longer running on a particular core. Also, a mechanism may be provided to restore state 3 lines to their previous state when it switches back.

By providing multiple cache residency suitability levels into state stored in cache lines of a cache memory, programmers are afforded more control over data and can increase performance without breaking an existing memory model.

Figure 3:
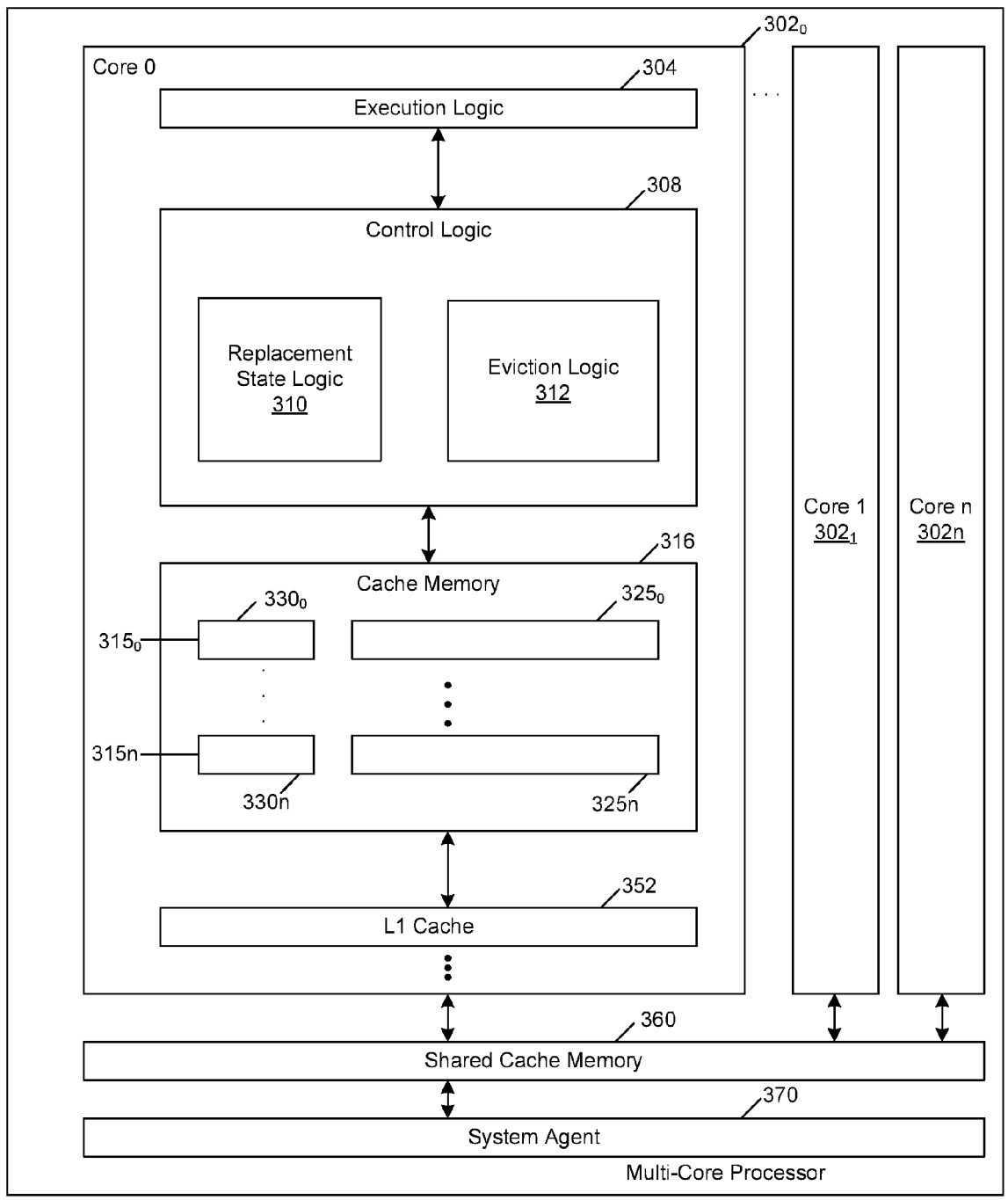
FIG. 3 is a block diagram of a processor in accordance with an embodiment of the present invention.

Referring now to FIG. 3, shown is a block diagram of a processor in accordance with an embodiment of the present invention. As shown in FIG. 3, processor 300 is a multicore processor including a plurality of cores $302_0$-$302_n$ (generically core 302). Although described herein as a multicore processor, understand the scope of the present invention is not limited in this regard and embodiments apply equally to single core processors, as well as to other components including a cache memory. In general, each core of the processor includes execution logic 304 which may generally take the form of a processor pipeline including a plurality of stages including one or more front end units, one or more execution units, and one or more backend units. In different implementations, the processor may be an in-order processor or an out-of-order processor.

Core 302 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Processor 300 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. Processor 300 may be a part of and/or may be implemented on one or more substrates using any of a number of process technologies, such as, for example, BiCMOS, CMOS, or NMOS. In some embodiments, processor 300 may be a system on a chip (SoC) that includes cores $302_0$-$n$.

In general, execution logic 304 operates to fetch instructions, decode the instructions, execute the instructions and retire the instructions. With particular emphasis on the replacement state operations described herein, some of these instructions, which can be user-level instructions or privileged level instructions, can be encoded to allocate data into a cache memory with a replacement state indicator of a particular level. In addition, other instructions may be used to update a level of a replacement state indicator stored in a particular cache line.

As seen in FIG. 3, execution logic 304 may couple to a control logic 308 which may be a cache controller or other control logic to control storage and retrieval operations with regard to a cache memory 316, which in an embodiment may be a lowest level cache, e.g., a so-called level zero (L0) cache memory. While control logic 308 may include various components, illustrated in FIG. 3 is a replacement state logic 310 and an eviction logic 312. In general, replacement state logic 310 may perform embodiments described herein such as discussed above with regard to FIGS. 1 and 2 to thus store data into the cache memory along with a corresponding replacement state indicator and also to update replacement state indicators, either responsive to an instruction or responsive to storage of a replacement state indicator in a different way of a set, as described herein. In turn, eviction logic 312 may consider the replacement state information stored in various ways of a set when determining an appropriate cache line for eviction.

Still referring to FIG. 3, cache memory 316 includes a plurality of entries or cache lines $315_0$-$315_n$ (generically cache line 315). In an embodiment, cache memory 316 may be implemented as an N-way M-set associative cache memory. As such, each of the M sets of the cache memory includes N ways. Each cache line 315 includes a data portion 325 that stores corresponding data while a metadata portion 330 includes various metadata associated with the data stored in the data portion. Such metadata may include tag information, cache coherency information, error correction coding information, and replacement state information in accordance with an embodiment of the present invention. Note that similar information may be stored in additional levels of cache memory.

In the embodiment shown, a next higher level of cache, namely a level 1 (L1) cache 352 is coupled to cache memory 316. In turn, multiple cores, namely cores $302_0$-$302_n$ each may couple to a shared cache memory 360 that in turn is coupled to a system agent 370, also referred to as uncore circuitry, which can include various components of a processor such as power control circuitry, memory controller circuitry, interfaces to off-chip components and the like. Although shown at this high level in the embodiment of FIG. 3, understand the scope of the present invention is not limited in this regard.

Figure 4:
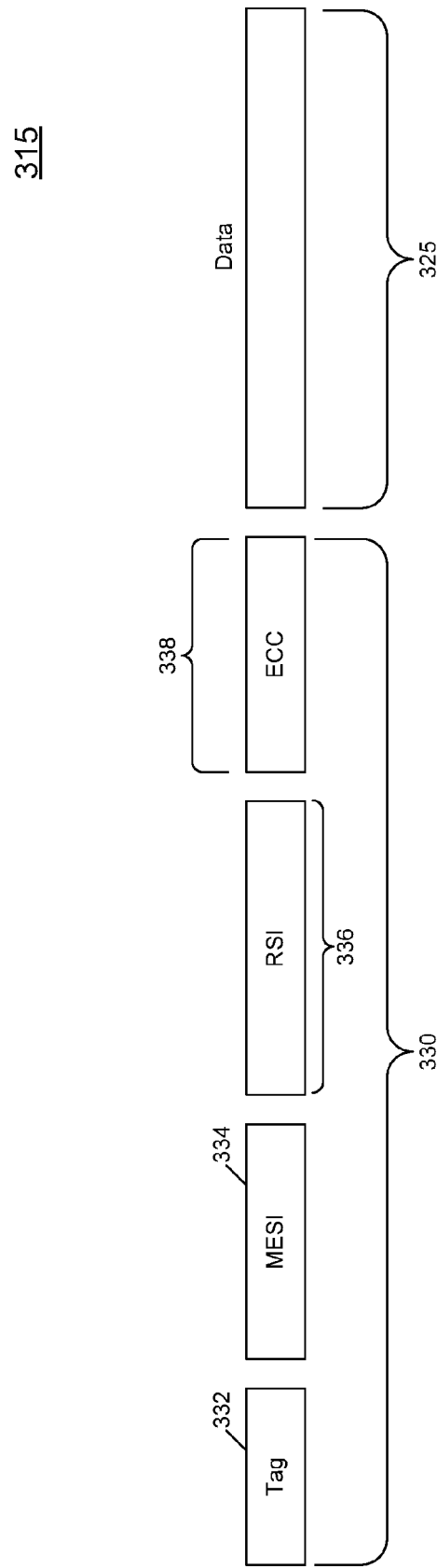
FIG. 4 is an illustration of an example cache line in accordance with an embodiment of the present invention.

Referring now to FIG. 4, shown is an illustration of an example cache line 315 in accordance with an embodiment of the present invention. As shown in FIG. 4, cache line 315 includes various constituent elements, including a data portion 325 and a metadata portion 330. Although the scope of the present invention is not limited in this regard in an embodiment data portion 325 may substantially correspond to a width of the cache line, which in an embodiment may be 64 bytes. In turn, a limited amount of state information is present in metadata field 330.

In the embodiment shown, this state information includes a tag field 332 to store a tag or other address information, a cache coherency field 334 which may storage cache coherency information which in an embodiment may be implemented using a modified exclusive shared invalid (MESI) cache coherency protocol. Metadata portion 330 further includes a replacement state field 336 to store a replacement state indicator in accordance with an embodiment of the present invention. In one embodiment this field may be a two bit field to thus encode one of four levels of replacement state information within the field. Of course other embodiments may include additional bits to encode a greater number of levels. Finally, metadata portion 330 further includes an error correction coding field 338 which may include error correction coding information. In other embodiments, instead of such information it is possible to instead provide error detection information such as parity information. Although described at this high level in the embodiment of FIG. 4, understand that various implementations are possible and different metadata may be present in other embodiments.

Figure 5:
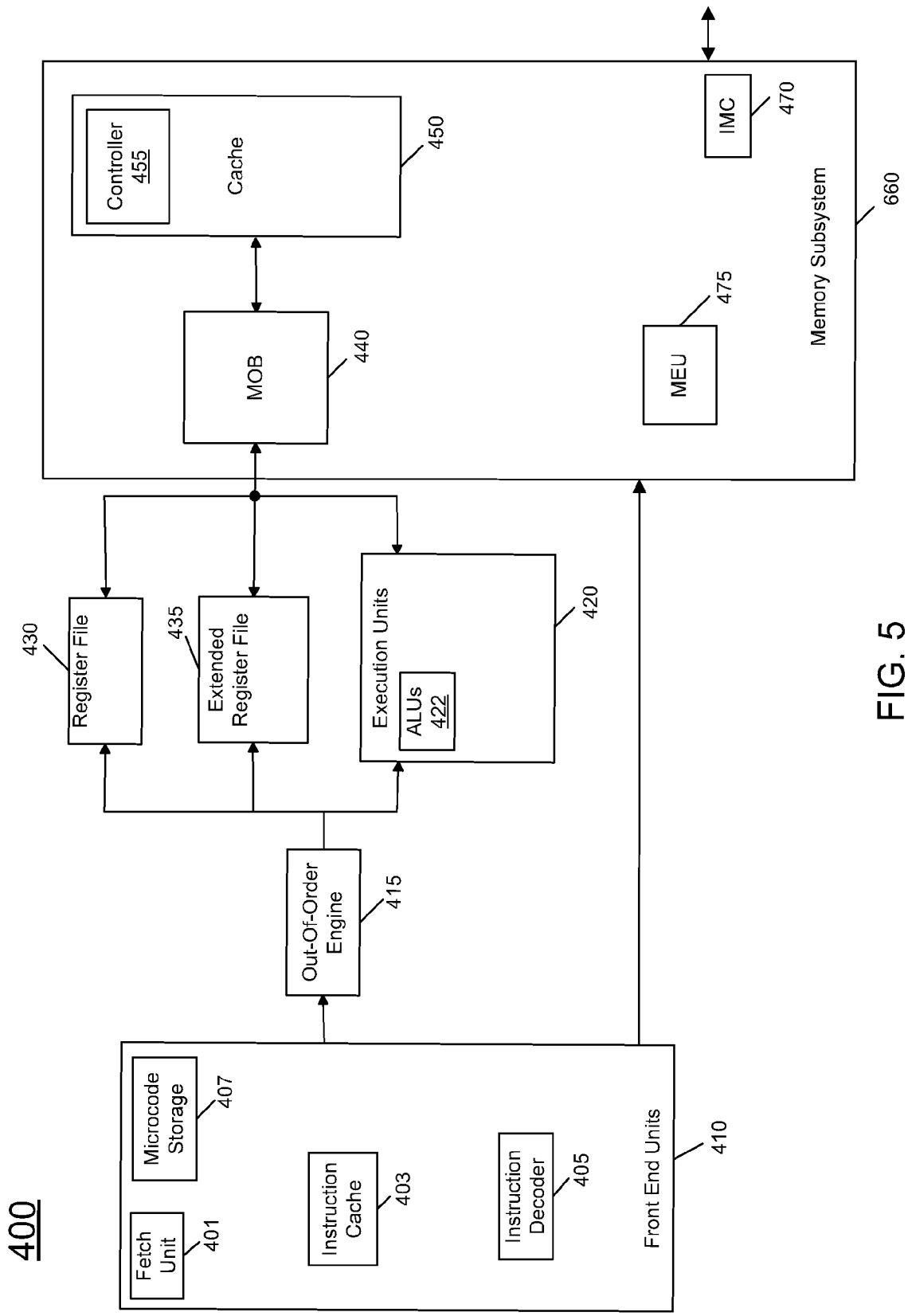
FIG. 5 is a block diagram of a processor core in accordance with one embodiment of the present invention.

Embodiments can be implemented in many different systems. For example, embodiments can be realized in a processor such as a multicore processor. Referring now to FIG. 5, shown is a block diagram of a processor core in accordance with one embodiment of the present invention. As shown in FIG. 5, processor core 400 may be one core of a multicore processor, and is shown as a multi-stage pipelined out-of-order processor. Processor core 400 is shown with a relatively simplified view in FIG. 5 to illustrate various features used in connection with cache management using replacement state information in accordance with an embodiment of the present invention.

As shown in FIG. 5, core 400 includes front end units 410, which may be used to fetch instructions to be executed and prepare them for use later in the processor. For example, front end units 410 may include a fetch unit 401, an instruction cache 403, and an instruction decoder 405. Instruction decoder 405 is configured to decode instructions such as the various user-level instructions disclosed herein that include an encoding of a replacement state level to be associated with data stored in a cache line. In some implementations, front end units 410 may further include a trace cache, along with microcode storage as well as a micro-operation storage. Fetch unit 401 may fetch macro-instructions, e.g., from memory or instruction cache 403, and feed them to instruction decoder 405 to decode them into primitives, i.e., micro-operations for execution by the processor. Also present may be a microcode storage 407.

Coupled between front end units 410 and execution units 420 is an out-of-order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435 such as by using renaming logic of the engine. Register file 430 may include separate register files for integer and floating point operations. Extended register file 435 may provide storage for vector-sized units, e.g., 256 or 512 bits per register.

Various resources may be present in execution units 420, including, for example, various integer, floating point, and single instruction multiple data (SIMD) logic units, among other specialized hardware. For example, such execution units may include one or more arithmetic logic units (ALUs) 422. Of course other execution units such as multiply-accumulate units and so forth may further be present. Results may be provided to a retirement logic, which may be implemented within a memory subsystem 460 of the processor. Various processor structures including execution units and front end logic, for example, may be coupled to a memory subsystem 460. This memory subsystem may provide an interface between processor structures and further portions of a memory hierarchy, e.g., an on or off-chip cache and a system memory. As seen the subsystem has various components including a memory order buffer (MOB) 440. More specifically, MOB 440 may include various arrays and logic to receive information associated with instructions that are executed. This information is then examined by MOB 440 to determine whether the instructions can be validly retired and result data committed to the architectural state of the processor, or whether one or more exceptions occurred that prevent a proper retirement of the instructions. Of course, MOB 440 may handle other operations associated with retirement.

As shown in FIG. 5, MOB 440 is coupled to a cache 450 which, in one embodiment may be a low level cache (e.g., an L0 cache) including a cache controller 455 to control storage and control operations such as replacement state information storage and evictions based at least in part on this information. Memory subsystem 460 also may include an integrated memory controller 470 to provide for communication with a system memory (not shown for ease of illustration in FIG. 5). Memory subsystem 460 may further include a memory execution unit 475 that handles various operations to initiate memory requests and handle return of data from memory.

From memory subsystem 460, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 6:
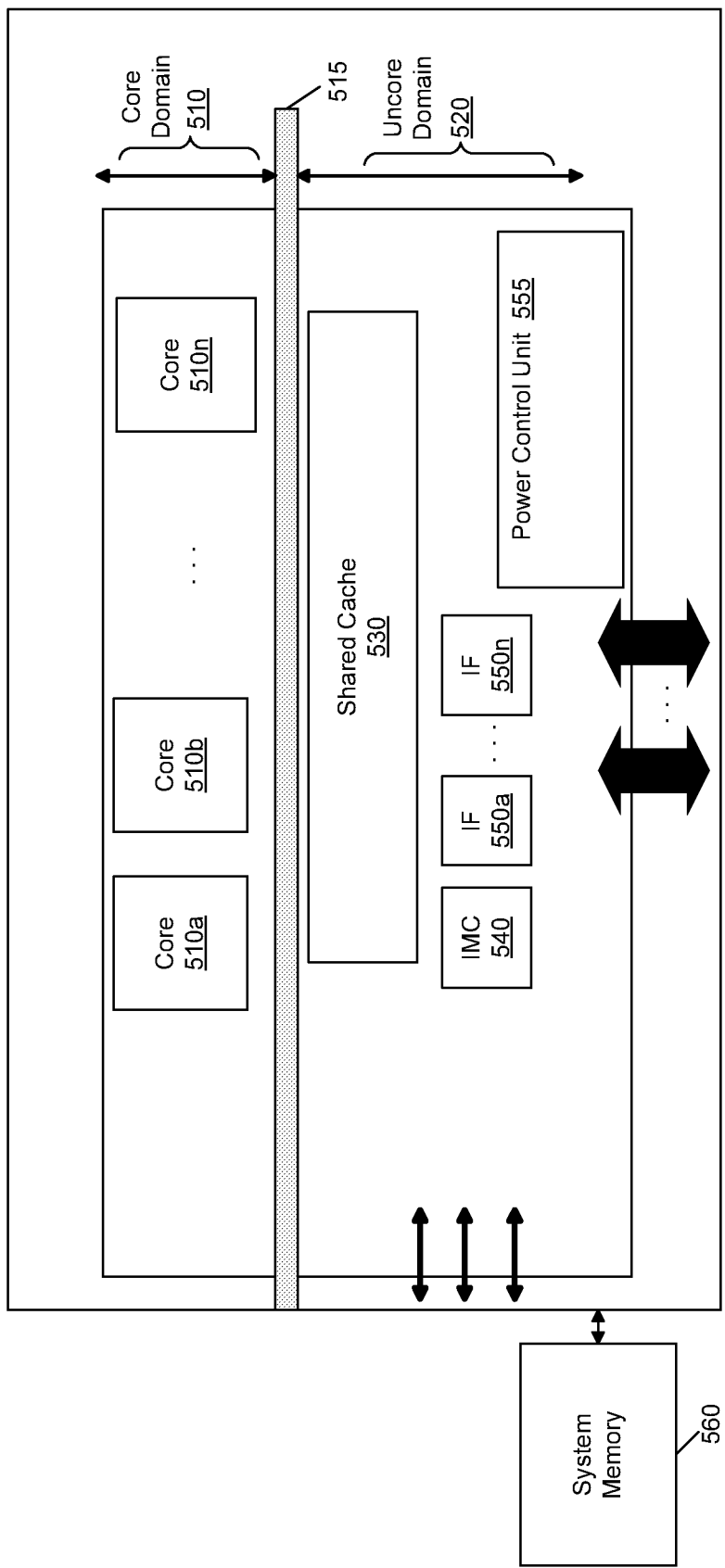
FIG. 6 is a block diagram of a processor in accordance with an embodiment of the present invention.

Referring now to FIG. 6, shown is a block diagram of a processor in accordance with an embodiment of the present invention. As shown in FIG. 6, processor 500 may be a multicore processor including a plurality of cores 510a-510n in a core domain 510. In one embodiment, each such core may be of an independent power domain and can be configured to operate at an independent voltage and/or frequency, and to enter turbo mode when available headroom exists, or the cores can be uniformly controlled as a single domain. Each such core may include a cache memory to store replacement state information as described herein. The cores may be coupled via an interconnect 515 to a system agent or uncore 520 that includes various components. As seen, the uncore 520 may include a shared cache 530 which may be a last level cache (and which may similarly provide for storage of replacement state information). In addition, the uncore may include an integrated memory controller 540, various interfaces 550, a power control unit 555 to control power consumption by the components of the processor, and an advanced programmable interrupt controller (APIC) 545 to control delegation of incoming interrupts.

With further reference to FIG. 6, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 6, the scope of the present invention is not limited in this regard.

Figure 7:
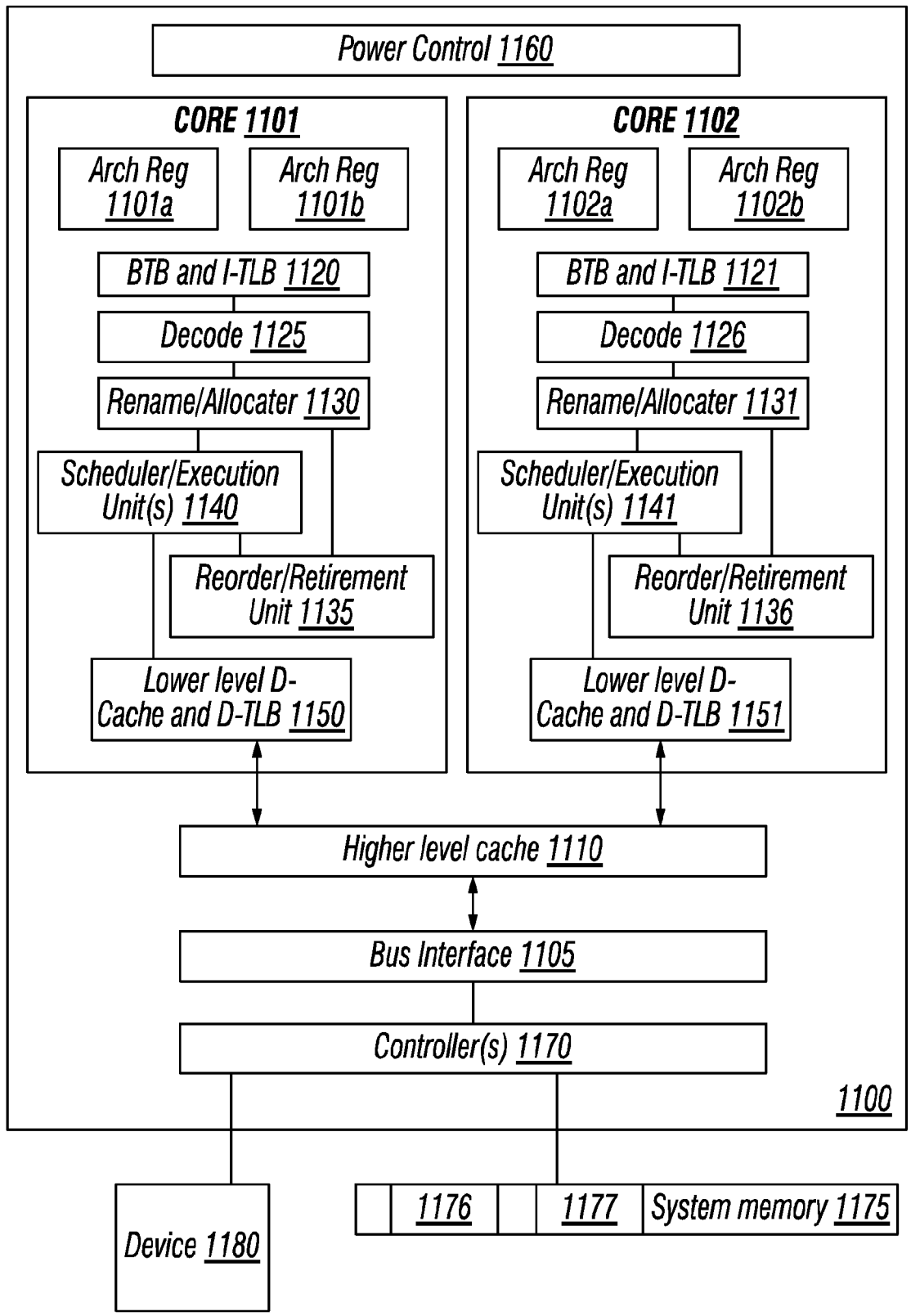
FIG. 7 is a block diagram of an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states and are further associated with multi-bit replacement state information as described herein. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
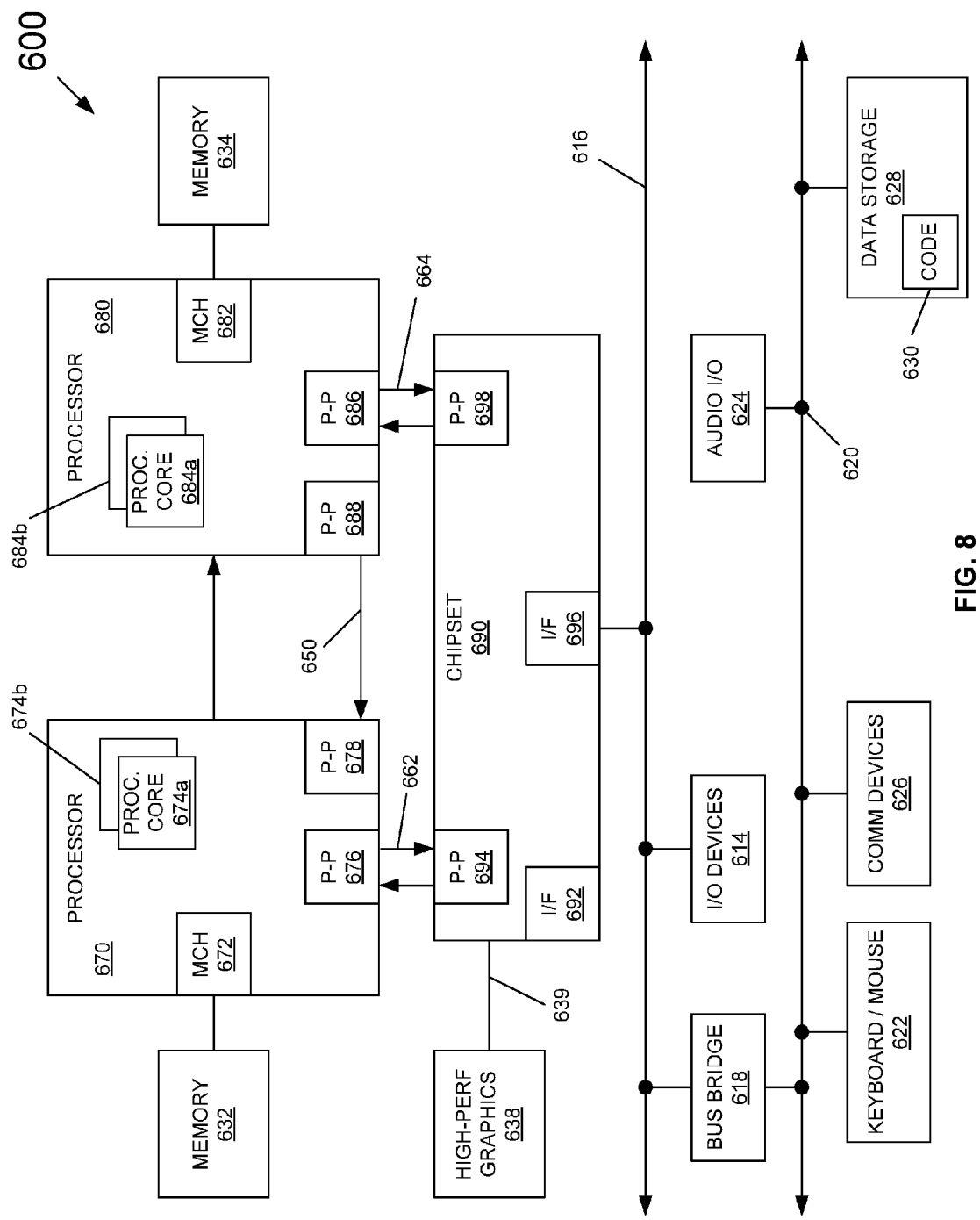
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include one or more cache memories that store replacement state information as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a cache memory including a plurality of entries each to store data and metadata associated with the data, each entry including a first metadata field to store a multi-bit replacement state indicator to indicate one of a plurality of levels of suitability of the data for replacement, wherein multiple ways of a set can be at the same level of the plurality of levels; and
control logic coupled to the cache memory to store the replacement state indicator when the data is stored in the entry and to update the replacement state indicator of a first way of a set when second data is to be written into a second way of the set, wherein the control logic is to store a replacement state indicator of a highest level of the plurality of levels responsive to a first user-level instruction that encodes a type of operation and a replacement state indicator of the highest level to indicate that the corresponding data is to be strongly resident, and store a replacement state indicator of a lowest level of the plurality of levels responsive to a second user-level instruction that encodes a type of operation and a replacement state indicator of the lowest level to indicate that the corresponding data is streaming data.

2. The processor of claim 1, wherein the control logic is, responsive to storage of a replacement state indicator having a level greater than a threshold in the first way of the set, to maintain a current level of one or more other ways of the set.

3. The processor of claim 1, wherein the control logic is, responsive to storage of a replacement state indicator having a level less than a threshold in the first way of the set, to decrement a current level of one or more other ways of the set.

4. The processor of claim 1, wherein the plurality of levels includes:

a first level to indicate that the data in the corresponding entry is to be evicted;
a second level to indicate that the data in the corresponding entry is less recently used;
a third level to indicate that the data in the corresponding entry is more recently used; and
a fourth level to indicate that the data in the corresponding entry is strongly resident.

5. A processor comprising:
a decode logic to receive and decode a first user-level memory access instruction to store data in a cache memory with a replacement state indicator of a first level, and to send the decoded first user-level memory access instruction to a control logic, the first user-level memory access instruction to encode a type of operation and an indication of the replacement state indicator of the first level; and
the control logic coupled to the cache memory to store the data in a first way of a first set of the cache memory and to store the replacement state indicator of the first level in a metadata field of the first way responsive to the decoded first user-level memory access instruction, the control logic to update the replacement state indicator stored in the metadata field of the first way to a different level when second data is to be stored in a second way of the first set that would cause all ways of the first set to have the replacement state indicator of the first level.

6. The processor of claim 5, wherein the first user-level memory access instruction comprises a user-level prefetch instruction.

7. The processor of claim 5, wherein the replacement state indicator of the first level indicates that the data is strongly resident.

8. The processor of claim 7, further comprising a configuration storage to store a value corresponding to a maximum number of ways of a set allowed to be at the first level.

9. The processor of claim 5, wherein the control logic is to update ways of the cache memory having the replacement state indicator of the first level, responsive to a context switch.

10. The processor of claim 5, wherein the decode logic is to receive a second user-level memory access instruction to indicate that third data is to be stored in the cache memory with a replacement state indicator of a fourth level, wherein the replacement state indicator of the fourth level indicates that the third data is suitable for eviction from the cache memory, the third data streaming data.

11. The processor of claim 5, wherein the decode logic is to decode a cache line flush instruction to indicate that a replacement state indicator of a cache line is to be updated to a fourth level to indicate that data of the cache line is suitable for eviction from the cache memory, but not to evict the cache line.

12. The processor of claim 11, wherein if the cache line is accessed responsive to a third memory access instruction prior to eviction, the control logic is to update replacement state indicator to a second level to indicate that the data of the cache line is more recently used.

13. A system comprising:
a multicore processor including a plurality of cores, each of the plurality of cores associated with a cache memory and each of the plurality of cores comprising a decode logic to receive and decode a first memory access instruction that encodes a type of operation and a replacement state indicator of a first level, to cause a control logic associated with the cache memory to store the data in a cache line with the replacement state indicator of the first level, wherein the cache memory includes a plurality of cache lines each having a data field and a metadata field, wherein the metadata field is to store a replacement state indicator of one of a plurality of levels to indicate a suitability of data stored in the data field for eviction, wherein the plurality of levels includes the first level to indicate that the data corresponding to a constant for a program is strongly resident and a second level corresponding to an eviction hint for the data; and a dynamic random access memory (DRAM) coupled to the multicore processor.

14. The system of claim 13, wherein the plurality of levels further includes a third level to indicate that the data is more recently used and a fourth level to indicate that the data is less recently used.

15. The system of claim 14, wherein each of the plurality of cores further includes the control logic to replace a cache line of a set of the cache memory having a replacement state indicator of the second level prior to replacement of a cache line of the set having a replacement state level of the first, third or fourth levels.

16. The system of claim 13, wherein the decode logic is to receive a second memory access instruction to store second data with a replacement state indicator of the second level, wherein the second data is streaming data.

17. The system of claim 13, wherein the decode logic is to decode a cache line flush instruction to update a replacement state indicator of a cache line to a second level, but not to evict the cache line.

18. A non-transitory machine-readable medium having stored thereon an instruction, which if performed by a machine causes the machine to perform a method comprising:

receiving and storing first data in a data portion of a first way of a set of a cache memory responsive to the instruction, the instruction comprising a user-level instruction that encodes a type of operation and a replacement state indicator having a first level;

storing the replacement state indicator having the first level in a metadata portion of the first way to indicate suitability of the data for eviction;

receiving and storing second data in a data portion of a second way of the set responsive to a second instruction; and maintaining a stored replacement state indicator stored in a metadata portion of the second way if the stored replacement state indicator is of a particular level, and otherwise changing the stored replacement state indicator to a replacement state indicator having a second level.

19. The non-transitory machine-readable medium of claim 18, wherein the method further comprises evicting the first data stored in the data portion of the first way prior to any other ways of the set, wherein the first level is a lowest level of a plurality of levels of replacement state and the first data is streaming data.

20. The non-transitory machine-readable medium of claim 18, wherein the method further comprises not evicting the first data stored in the data portion of the first way and evicting data of a different way of the set, wherein the level is a highest level of a plurality of levels of replacement state and the first data is strongly resident.

21. The non-transitory machine-readable medium of claim 18, wherein the method further comprises responsive to a third instruction, updating the replacement state indicator in the metadata portion of the first way to a lowest level of a plurality of levels of replacement state, but not evicting the first data.

22. The non-transitory machine-readable medium of claim 21, wherein the third instruction comprises a cache line eviction hint instruction including an encoding for the lowest level.

23. The non-transitory machine-readable medium of claim 18, wherein the instruction comprises a user-level prefetch instruction including an encoding for the replacement state indicator level.

* * * * *